Figure 1:
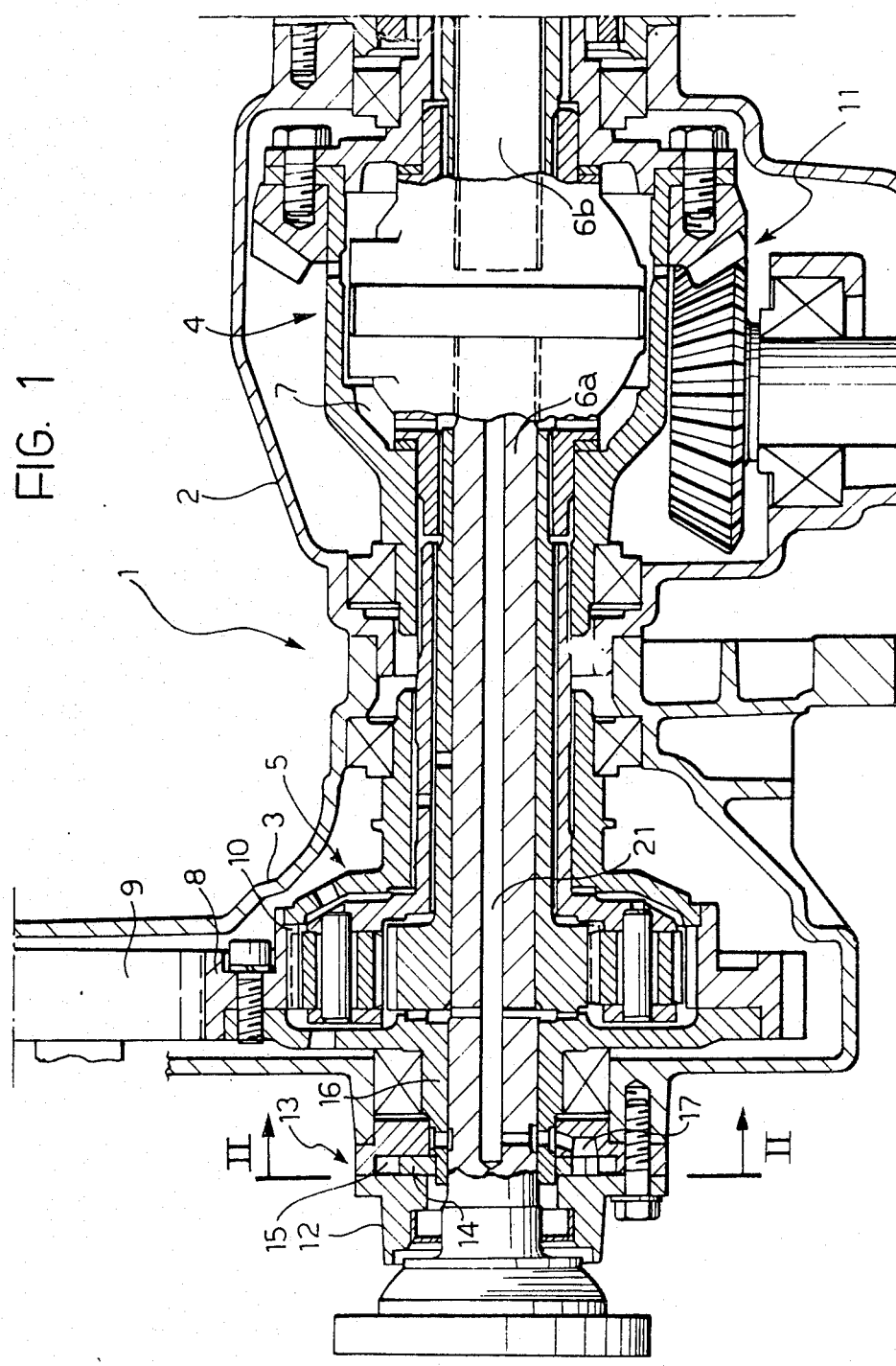

United States Patent [19]

Falzoni et al.

[11] Patent Number: 4,899,851
[45] Date of Patent: Feb. 13, 1990

[54] PRESSURE LUBRIFICATION DEVICE FOR TRANSMISSION SYSTEMS OF MOTOR VEHICLES WITH TRANSVERSE GEARBOXES

[75] Inventors: Gian L. Falzoni; Federico Cordero, both of Turin, Italy

[73] Assignee: Fiat Auto S.p.A., Turin, Italy

[21] Appl. No.: 371,381

[22] Filed: Jun. 23, 1989

[30] Foreign Application Priority Data

Jul. 1, 1988 [IT] Italy ................................ 67623 A/88

[51] Int. Cl.[4] .................................................. F01M 9/10
[52] U.S. Cl. .................................... 184/6.12; 74/467
[58] Field of Search ................ 184/6.12; 74/467, 701, 74/695

[56] References Cited

U.S. PATENT DOCUMENTS 4,635,504  1/1987  Cordero et al. ...................... 74/695

Primary Examiner—Carroll B. Dority
Attorney, Agent, or Firm—Hedman, Gibson, Costigan & Hoare

[57] ABSTRACT

A pressure lubrication device for the transmission systems of four-wheel-drive motor vehicles with transverse gearboxes comprises a rotary pump with internal lobes which is situated beside the torque divider of the transmission and the internal rotor of which is rotated by the output member of the gearbox.

3 Claims, 2 Drawing Sheets

PRESSURE LUBRIFICATION DEVICE FOR TRANSMISSION SYSTEMS OF MOTOR VEHICLES WITH TRANSVERSE GEARBOXES

The present invention relates in general to transmission systems for motor vehicles with transverse gearboxes and is more particularly concerned with a pressure lubrication device for a four-wheel-drive transmission including a gearbox output member, a front differential, and a torque divider coaxial with the drive-shafts of the front wheels of the vehicle.

Pressure lubrication is necessary in transmissions of this type in order for the lubricant to reach all the rotating parts and in order to provide for the dissipation of the heat produced during operation, by the circulation of the oil.

The object of the present invention is to produce a lubrication device for transmission systems of the above type, which is simple and cheap to manufacture and which can also be fitted to existing transmission systems of the above type, without the need to modify the gearboxes of these transmissions.

According to the invention, this object is achieved by virtue of the fact that the lubrication device comprises a rotary pump with internal lobes and includes a casing situated beside the torque divider, coaxial with one of the front drive-shafts, and having an inlet and an outlet for the lubricant, and a pair of lobed rotors, inner and outer respectively, of which the inner one is keyed to the output member of the gearbox.

The inlet of the casing conveniently communicates with a tubular connector for the intake of oil from the lower part of the gearbox.

To advantage, this casing is incorporated in a cover which is fixed to the gearbox and has the function of retaining the torque divider axially and that of sealing in the transmission lubricant.

Figure 2:
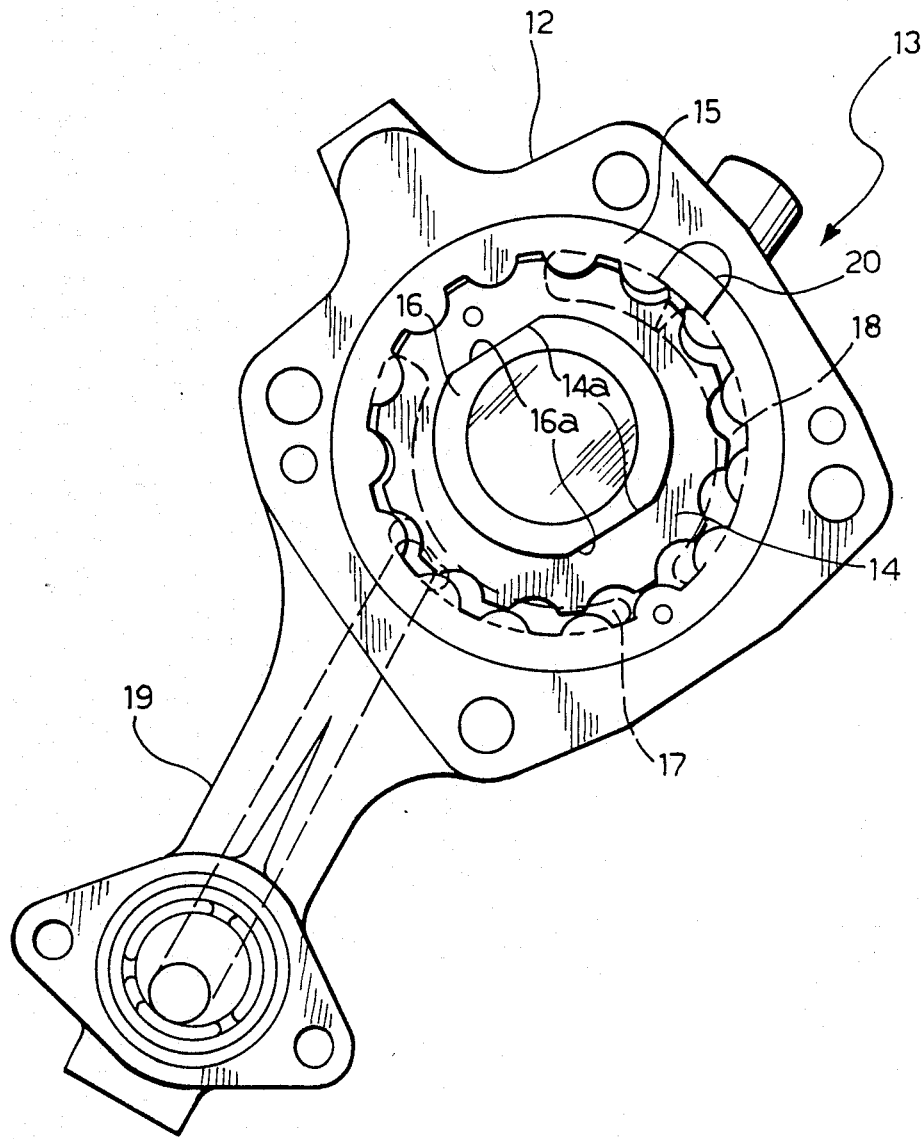

The invention will now be described in detail with reference to the appended drawings, provided purely by way of non-limiting example, in which:

FIG. 1 is a partially-sectioned view of a transmission system for motor vehicles incorporating a pressure lubrication device according to the invention, and FIG. 2 is a cross-section taken on the line II—II of FIG. 1, on an enlarged scale.

In FIG. 1, part of a transmission for a four-wheel-drive motor vehicle whose engine and gearbox are arranged transverse the length of the vehicle is generally indicated 1. The transmission 1 is of type generally known, for example, from EP-A-247008 in the name of the Applicant. For the purposes of the present invention, it is sufficient to state that it comprises a casing 2 fixed firmly to the gearbox casing 3 containing a front differential 4 and an intermediate differential or torque divider 5, both of which are coaxial with the drive-shafts 6a and 6b of the front wheels of the vehicle.

The front differential 4 includes a cage 7 which is driven by a final reduction ring 8 meshed with a gear 9 carried by the counter shaft of the gearbox and has the function of transmitting the driving torque to the two front drive-shafts 6a, 6b.

The torque divider 5 is constituted by an epicyclic train having a ring 10 firmly fixed to the final reduction ring 8 of the gearbox. The divider 5 has the function of dividing the driving torque between the front differential 4 and, through a transmission unit 11, a rear differential, not illustrated, associated with the drive-shafts of the rear wheels of the vehicle.

An annular cover, indicated 12, is arranged coaxially on the outer end of the front drive shaft 6a and is fixed sealingly to the gearbox casing 3 in the manner should. The cover 12 has the function of the retaining the divider 5 axially, as well as that of keeping the lubrication oil in the casings 2 and 3.

According to the invention, the cover 12 also performs an additional function: it is in fact formed as the stator-casing of a rotary hydraulic pump 13 which serves to effect the pressure lubrication of the transmission 1 by circulating the lubricant contained in the casings 2 and 3. As is better illustrated in FIG. 2, the pump 13 is of the type with internal lobes: in fact, it includes two mating lobed rotors, an inner one 14 and the outer one 15 respectively, of which the former is keyed concentrically to a hub part 16 of the final reduction ring 8. This hub part 16 is coaxial with the front drive-shaft 6a and has a pair of diametrally opposed flats 16a with which corresponding internal flats 14a of the inner rotor 14 are coupled to retain it for rotation.

The outer rotor 15 is eccentric with respect to the inner rotor 14 and is rotated by the latter in conventional manner to pump the lubricant from an inlet chamber 17 to an outlet chamber 18 formed in the stator 13, in the manner shown schematically in FIG. 2.

The inlet chamber 17 communicates with an intake duct 19 connected to the lower part of the gear box casing 3, whilst the outlet chamber 18 communicates with a delivery duct 20 for sending the lubricant to the regions of the transmission 1 to be lubricated, through an axial passage 21 formed in the front drive-shaft 6a.

We claim:

1. A pressure lubrication device for transmission systems for motor vehicles with transverse gearboxes, particularly a four-wheel-drive transmission including a gearbox output member, a front differential, and a torque divider coaxial with the drive-shafts of the front wheels of the vehicle, comprising a rotary pump (3) with internal lobes including a casing (3) siutated beside the torque divider (5), coaxial with one of the front drive-shafts (6a, 6b) and having an inlet and an outlet (17, 18) for lubricant, and a pair of lobed rotors, inner and outer (14, 15) respectively, of which the inner one is keyed to the output member (8) of the gearbox.

2. A device according to claim 1, comprising a tubular connector (19) which the inlet (17) of the casing (3) of the pump (13) communicates with for the intake of lubricant from the lower part of the gearbox.

3. A device according to claim 1, comprising a cover (12) fixed to the casing (3) of the gearbox and in which the pump (13) is incorporated.

* * * * *